United States Patent
Pisut et al.

(10) Patent No.: US 9,432,996 B2
(45) Date of Patent: Aug. 30, 2016

(54) SYSTEM AND METHOD FOR TRANSMITTING AND RECEIVING FREQUENCY RESOURCE INFORMATION IN A FREQUENCY OVERLAY SYSTEM

(71) Applicant: Samsung Electronics Co. Ltd., Suwon-si, Gyeonggi-do (KR)

(72) Inventors: Sanyadechukal Pisut, Suwon-si (KR); Jae-Hee Cho, Seoul (KR); Hee-Kwun Cho, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/849,040

(22) Filed: Sep. 9, 2015

(65) Prior Publication Data

US 2015/0382354 A1 Dec. 31, 2015

Related U.S. Application Data

(63) Continuation of application No. 13/887,709, filed on May 6, 2013, which is a continuation of application No. 12/473,672, filed on May 28, 2009, now Pat. No. 8,437,304.

(30) Foreign Application Priority Data

Jun. 2, 2008 (KR) .................. 10-2008-0051822

(51) Int. Cl.
*H04L 5/00* (2006.01)
*H04W 72/04* (2009.01)
*H04W 28/06* (2009.01)

(52) U.S. Cl.
CPC ........ *H04W 72/0453* (2013.01); *H04L 5/0005* (2013.01); *H04L 5/0023* (2013.01); *H04L 5/0091* (2013.01); *H04W 72/04* (2013.01); *H04W 72/042* (2013.01); *H04L 5/0007* (2013.01); *H04W 28/06* (2013.01); *H04W 72/0406* (2013.01)

(58) Field of Classification Search
CPC .. H04L 5/0094; H04L 5/0023; H04W 28/06; H04W 8/26; H04W 72/0406; H04W 72/1289; H04W 72/0453
See application file for complete search history.

(56) References Cited

U.S. PATENT DOCUMENTS

| | | | |
|---|---|---|---|
| 5,566,168 A | 10/1996 | Dent | |
| 6,542,752 B1* | 4/2003 | Illidge | H04W 68/04 340/7.21 |
| 8,830,945 B2* | 9/2014 | Lee | H04L 5/0053 370/330 |
| 2006/0240838 A1* | 10/2006 | Suh | H04W 16/32 455/454 |
| 2008/0049692 A1* | 2/2008 | Bachu | H04L 1/1819 370/338 |
| 2008/0192705 A1* | 8/2008 | Suzuki | H04L 1/0061 370/335 |
| 2009/0291686 A1* | 11/2009 | Alpert | H04W 36/0083 455/436 |
| 2013/0170457 A1* | 7/2013 | Pelletier | H04L 1/1812 370/329 |

* cited by examiner

*Primary Examiner* — Raj Jain
(74) *Attorney, Agent, or Firm* — Jefferson IP Law, LLP

(57) ABSTRACT

A system and method for transmitting and receiving frequency allocation information based on identification information in a frequency overlay system are provided. The method includes transmitting a frame of a first Frequency Allocation (FA) to Mobile Stations (MSs) by inserting control information and identification information of the MSs to which frequency resources are allocated into the first FA frame, and transmitting a second frame indicating a second FA the MSs by inserting the identification information and a resource indication of the first FA into the second FA frame. Thereby, an overhead can be reduced and a frequency resource can be used efficiently.

24 Claims, 6 Drawing Sheets

TREE-BASED

RUN-LENGTH

PATTERN-BASED

SYSTEM AND METHOD FOR TRANSMITTING AND RECEIVING FREQUENCY RESOURCE INFORMATION IN A FREQUENCY OVERLAY SYSTEM

PRIORITY

This is a continuation application of a prior application Ser. No. 13/887,709 filed on May 6, 2013, which is a continuation application of a prior application Ser. No. 12/473,672 filed on May 28, 2009 in the U.S. Patent and Trademark Office, which has issued as U.S. Pat. No. 8,437,304 on May 7, 2013, and which claimed the benefit under 35 U.S.C. §119(a) of a Korean patent application filed on Jun. 2, 2008 in the Korean Intellectual Property Office and assigned Serial number 10-2008-0051822, the entire disclosures of which are hereby incorporated by reference.

BACKGROUND OF THE INVENTION

1. Field of the Invention

The present invention relates generally to a frequency overlay system. More particularly, the present invention relates to a system and method for transmitting and receiving frequency allocation information based on identification information in a frequency overlay system.

2. Description of the Related Art

In general, frequency resources of 5~20 MHz are allocated to Mobile Stations (MSs) according to the Institute of Electrical and Electronics Engineers (IEEE) 802.16m standard. Available frequency resources of a Base Station (BS) are divided into a plurality of Frequency Allocations (FAs) which can be allocated to each MS serviced by the BS. In the IEEE 802.16m standard, a one-dimensional resource allocation scheme is used due to its low complexity, small overhead, separate coding MAP message, and high link adaptation gain of a MAP Information Element (IE) of each MS.

Frequency overlay is used to support MSs using various bandwidths. Thus, frequency resources of the BS are divided into multiple FAs and an MS accesses each FA according to an available bandwidth. Accordingly, a one-dimensional resource allocation algorithm of separate coding capable of efficiently operating using the multi-FA is provided to a frequency overlay system.

FIG. 1 illustrates a frequency overlay system having two 10-MHz Fas according to the related art.

Referring to FIG. 1, when frequency resources of 20 MHz are allocated, a BS 140 of the frequency overlay system divides the frequency resources allocated to the BS 140 into two 10-MHz FAs. Here in, the first FA (FA#1) is allocated to an MS-A 110 and the second FA is allocated to an MS-C 130, while, FA#1 and FA#2 are allocated to an MS-B 120. In this way, both the MSs capable of accessing 10 and 20 MHz bandwidth can be supported under the same BS's frequency resources of 20 MHz.

The concept of a separate coding MAP message will be described using FIG. 1. The IEs of the MAP message are encoded for each MS. The BS controls a Modulation and Coding Selection (MCS) level by the MAP message. When separate coding is used, power for each IE is allocated according to the current channel state of a designated MS instead of an MS who experiences the worst communication state. In the separate coding MAP message, each IE is considered as one MAP message and a Cyclic Redundancy Check (CRC) field is added to the end of each IE. This additional overhead problem is mitigated by removing a Connection IDentifier (CID) field of an MS from each IE. In this case, each IE is individually scrambled in a method in which the IE can be detected and decoded by only a specific MS. When the separate coding MAP message is used, a method in which each MS is not required to detect MAP IEs of other MSs shall be used.

FIGS. 2A to 2C illustrate protocol structures in a frequency overlay system according to the related art.

Referring to FIGS. 2A to 2C, various protocol structures for frequency overlay capacity of the system are provided. The most simplified protocol structure is a single-FA protocol structure illustrated in FIG. 2A. In the single-FA protocol structure, Media Access Control (MAC) layers 202, . . . , 204 and physical layers 206, . . . , 208 are separated and each frequency is allocated through the separated layers. However, the separations in MAC and physical layers limit the amount of information that can be shared among FAs. This deficiency of the shared information inevitably increases an unnecessary overhead from MAC processing processes of MAC layers such as those in network entries, bandwidth requests, or Quality of Service (QoS) which have to be repeated in each FA.

To mitigate the above-described problem, a frequency overlay protocol structure as illustrated in FIG. 2B includes one common MAC layer 210 and a plurality of physical layers 212, . . . , 214. Each physical layer is associated with each FA. The structure as illustrated in FIG. 2B is referred to as a multi-FA protocol structure. Since the common MAC layer can be efficiently harmonized with each FA in the multi-FA protocol structure, a MAC overhead may be reduced by avoiding repeatedly processing a plurality of FAs. However, a MAC packet needs to be encoded in multiple physical packets since there is a plurality of physical layers, and a physical packet encoded within each physical layer leads to additional overhead since one additional CRC field is required for each physical packet. Here, a MAP IE is independently created and transmitted for each FA.

To mitigate an overhead problem occurring in frequency resource allocation, a frequency overlay protocol structure having one MAC layer 216 and one physical layer 218 may be used as illustrated in FIG. 2C. Since there is only the single physical layer in the structure, a MAC packet is encoded in one physical packet and the one physical packet is classified into FAs that are available later 200, . . . , 222. A single MAP IE may be used to indicate frequency resource allocation within multiple FAs, thereby reducing an overhead occurring in frequency resource allocation in the frequency overlay system.

A frequency resource allocation scheme applied to the IEEE 802.16m standard is a one-dimensional allocation scheme.

FIGS. 3A to 3D illustrate one-dimensional allocation schemes according to the related art.

Referring to FIGS. 3A to 3D, the one-dimensional allocation schemes include a start-length allocation scheme (illustrated in FIG. 3A), a run-length allocation scheme (illustrated in FIG. 3B), a tree-based allocation scheme (illustrated in FIG. 3C), and a pattern-based allocation scheme (illustrated in FIG. 3D).

In the start-length allocation scheme illustrated in FIG. 3A, frequency resource allocation of each MS is classified by a starting point and a length of allocated frequency resources. In the tree-based allocation scheme illustrated in FIG. 3B, tree-structured nodes are used to indicate all frequency resources of a BS and frequency resources allocated to each MS are indicated by a node ID of a corresponding node. In the run-length allocation scheme illustrated in FIG. 3C, frequency resource allocation for each MS is classified by only a length of allocated frequency resources. In this case, each MS detects all length fields allocated to previous MSs in order to compute a starting point.

The pattern-based allocation scheme illustrated in FIG. 3D uses continuous bits to indicate a frequency resource allocation pattern allocated to each MS.

The four allocation schemes are well known. Among the four allocation schemes, the run-length allocation scheme has a smallest MAP overhead in a joint coding MAP message and each MS may detect all individual MAP IEs of other MSs. On the other hand, the tree-based allocation scheme has a smallest overhead in the case of a separate coding MAP message and each individual MAP IE may be detected by only a corresponding MS.

However, there is a problem in that a conventional MAP IE format for frequency resource allocation between FAs leads to a significant overhead.

Therefore, a need exists for a system and method for reducing MAP overhead in frequency resource allocation between FAs.

SUMMARY OF THE INVENTION

An aspect of the present invention is to address at least the above-mentioned problems and/or disadvantages and to provide at least the advantages described below. Accordingly, an aspect of the present invention is to provide a frequency resource allocation apparatus and method for reducing a MAP overhead using a frequency resource allocation scheme based on identification information in a frequency overlay system.

In accordance with an aspect of the present invention, a method for transmitting frequency resource information by a Base Station (BS) in a frequency overlay system is provided. The method includes transmitting a first frame indicating a first Frequency Allocation (FA) to Mobile Stations (MSs) by inserting control information and identification information of the MSs to which frequency resources are allocated into the first frame, and transmitting a second frame indicating a second FA to the MSs by inserting the identification information allocated in the first FA and a resource indication of the second FA into the second frame.

In accordance with another aspect of the present invention, a method for receiving frequency resource information by an MS in a frequency overlay system is provided. The method includes acquiring identification information inserted into a first frame indicating a first FA transmitted from a BS, and receiving frequency resource allocation by acquiring, when the identification information is acquired, a resource indication corresponding to the acquired identification information from a second frame indicating a second FA transmitted after the first frame.

In accordance with a further aspect of the present invention, a system for transmitting and receiving frequency resource information in a frequency overlay system is provided. The system includes a BS for transmitting a first frame indicating a first FA to MSs by inserting control information and identification information of the MSs to which frequency resources are allocated into the first frame and for transmitting a second frame indicating a second FA to the MSs by inserting the identification information allocated in the first FA and a resource indication of the second FA into the second frame, and an MS for acquiring the identification information inserted into the first frame transmitted from the BS and for receiving frequency resource allocation by acquiring, when the identification information is acquired, a resource indication corresponding to the acquired identification information from the second frame transmitted after the first frame.

In accordance with still another aspect of the present invention, a method for transmitting frequency resource information by a BS in a frequency overlay system is provided. The method includes determining whether an FA allocated to an MS is single-FA or multi-FA, transmitting a first frame indicating a first FA to the MS by setting a multi-FA allocation flag to an activation state when the FA allocated to the MS is the multi-FA and inserting into the first frame a resource indication indicating frequency resources of the allocated FA and control information and identification information of the MS into the first frame, transmitting a second frame indicating FA subsequent to the first FA to the MS by inserting the identification information allocated in the first FA and frequency resource information of the subsequent FA into the subsequent frames, and transmitting a third frame indicating the first FA to the MS by setting the multi-FA allocation flag to a deactivation state when the FA allocated to the MS is the single-FA and inserting into the first FA frame a resource indication indicating frequency resources of the allocated FA and control information of the MS.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention, a plurality of Frequency Allocations (FAs) that are divided into a primary (or first) FA and one or more secondary (or second) FAs, and frequency resources that are allocated through each FA.

Figure 4:
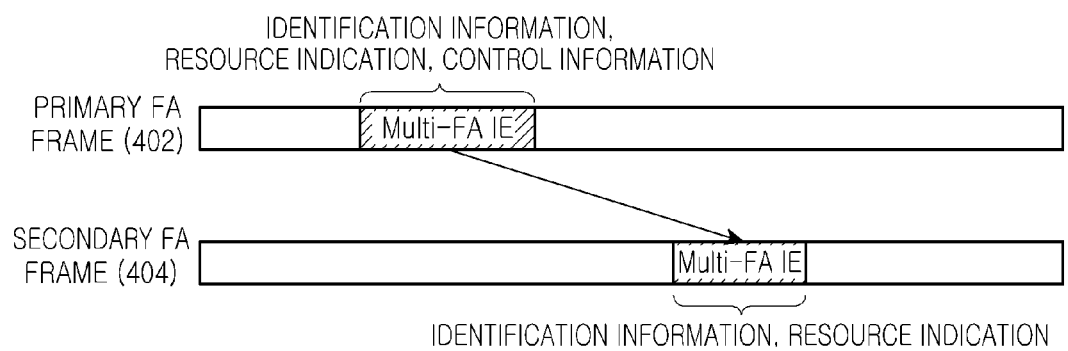
FIG. 4 illustrates an exemplary allocation of frequency resources based on identification information according to an exemplary embodiment of the present invention.

FIG. 4 illustrates an exemplary allocation of frequency resources based on identification information according to an exemplary embodiment of the present invention.

Referring to FIG. 4, identification information (for example, a mini IDentification (ID)) having a relatively small number of bits is allocated to each resource-allocated Mobile Station (MS) in which multi-FA may be used through a MAP Information Element (IE) 402 within a primary FA. The MAP IE 402 of the primary FA includes the identification information and a resource indication. The MAP IE 402 of the primary FA further includes other control information, that is, a Connection IDentifier (CID), a Modulation and Coding Selection (MCS) level and the like. A MAP IE 404 of a secondary FA includes a frequency resource indication and identification information. That is, a redundant overhead, such as a CID or MCS level of the MS may be removed from the secondary FA. The redundant control information may be read through the MAP IE 402 allocated in the primary FA. Since a size of the MAP IE 404 allocated in the secondary FA is small, the MAP IEs 404 allocated in the secondary FA may be included in one 48-bit physical resource block having one Cyclic Redundancy Check (CRC) field. In other words, control information, such as identification information, a frequency resource indication and an MCS level is transmitted in the MAP IE 402 of the primary FA and identification information and a frequency resource indication are transmitted in the MAP IE 404 of the secondary FA.

The frequency resource allocation scheme is referred to as a frequency resource allocation scheme based on identification information.

Figure 1:
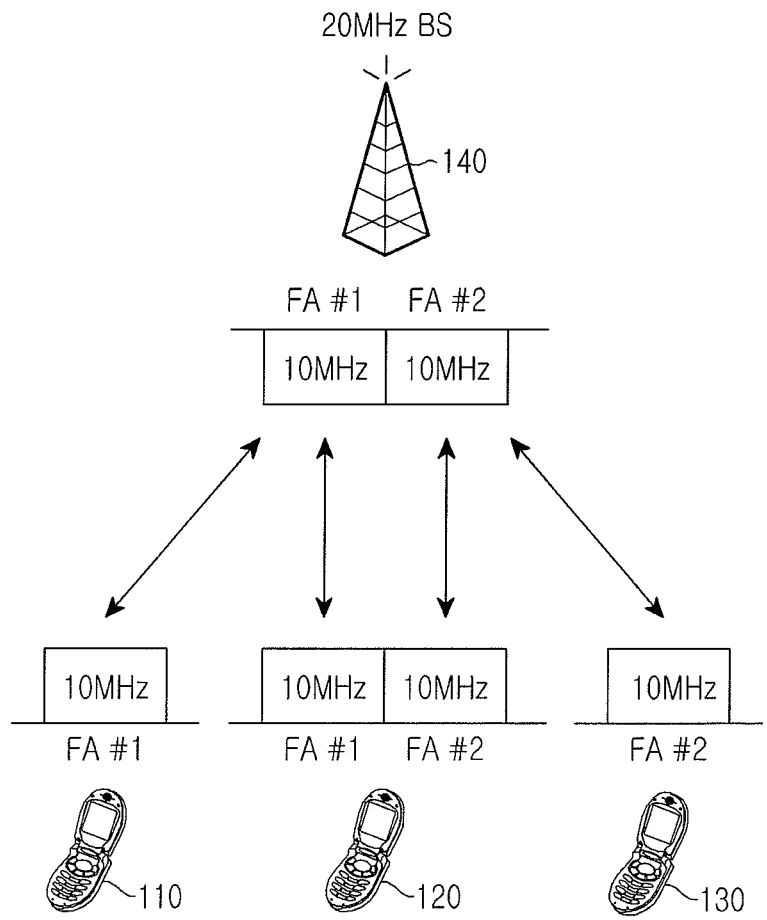
FIG. 1 illustrates a frequency overlay system having two frequency resources of 10 MHz according to the related art.
Figure 2A:
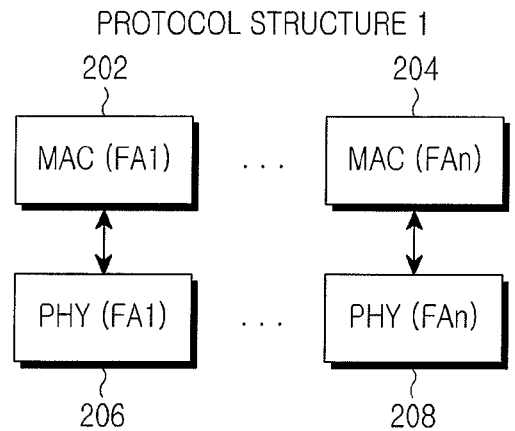
FIGS. 2A to 2C illustrate protocol structures in a frequency overlay system according to the related art.
Figure 2B:
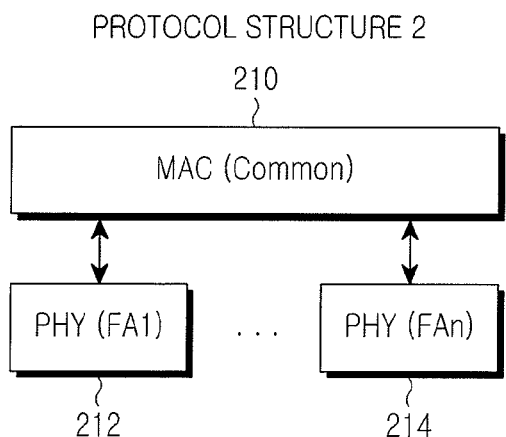
Figure 2C:
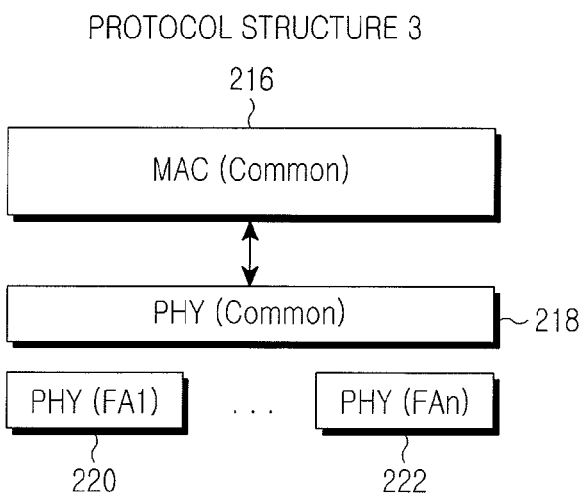
Figure 3A:
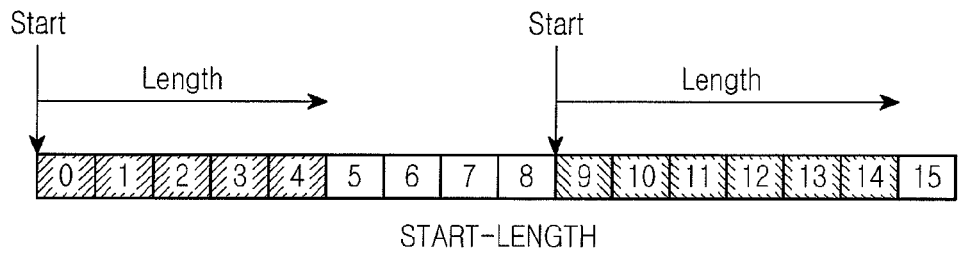
FIGS. 3A to 3D illustrate one-dimensional allocation schemes according to the related art.
Figure 3B:
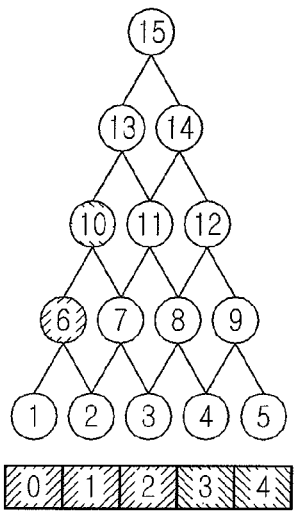
Figure 3C:
Figure 3D:
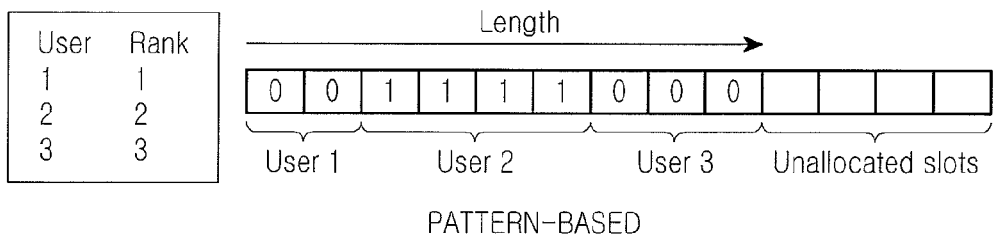

In an exemplary implementation, the frequency resource allocation scheme based on identification information is applied to the protocol structures of FIGS. 2B and 2C, and has a smaller MAP overhead than in the case where an operation is performed under an environment of the common physical layer 218 of FIG. 2C. On the other hand, the protocol structure using the frequency resource allocation scheme based on identification information is applied to reduce performance degradation of MSs that do not support the frequency overlay system.

To reduce the MAP overhead, a concept of allocating identification information of an MS to which resources are allocated through the primary FA according to an exemplary embodiment of the present invention will be described. The overhead occurring in the transmission of overlapped information between different FAs is reduced by including identification information of each MS allocated through the primary FA in the MAP IE of each secondary FA. More particularly, the MAP IE of the primary FA of each MS includes one identification information element allocated to each MS. The identification information is used to identify MAP IEs of the MSs to be transmitted within all secondary FAs. The MAP IE of each secondary FA includes a resource indication field for indicating a position of frequency resources allocated in a specific FA without including a redundant overhead, such as a CID and an MCS level for use in control information given to the MAP IE of the primary FA. Accordingly, when the number of MSs existing in one subframe is small, only several bits (for example, 3 bits for the maximum of 8 users in one subframe) are sufficient to indicate identification information.

The identification information is not permanently allocated. Each BS periodically determines identification information allocation or whenever resource allocation changes, and each MS updates its identification information and frequency resource allocation whenever the MAP IE in the primary FA is detected. One identification information element is valid only during a specific period. When the specific period expires, each MS deletes the identification information.

According to the above-described exemplary embodiment of the present invention, the frequency resource allocation scheme based on identification information is differently applied according to joint coding and separate coding.

In the case of the joint coding, the run-length scheme uses a frequency resource indication method allocated to provide a MAP overhead as small as possible. In the case of the joint coding, the format of identification information within the primary FA and the secondary FA and the format of a run-length MAP IE are shown in Table 1 and Table 2. The following Table 1 shows a structure of MAP IE fields of the primary FA in a joint coding MAP message. The following Table 2 shows a structure of MAP IE fields of the secondary FA in the joint coding MAP message.

TABLE 1

| Fields | Bits | Comment |
| --- | --- | --- |
| CID | 16 | |
| DIUC | 4 | |
| Repetition Coding Indication | 2 | |
| Power Boosting | 3 | |
| Length | 7 | Number of allocated slots in primary FA |
| Multi-FA allocation flag | 1 | 0: Single-FA alloc. 1: Multi-FA alloc. |
| if(Multi-FA allocation flag ==1){ Mini ID } | 3 | ID used to identify a user in secondary FA(s) |

TABLE 2

| Fields | Bits | Comment |
| --- | --- | --- |
| Mini ID | 3 | ID used to identify a user in secondary FA(s) |
| Length | 7 | Number of allocated slots in each secondary FA |

In the above Table 1, the MAP IE of the primary FA includes a CID field, a Downlink Interval Usage Code (DIUC) field, a repetition coding indication field, a power boosting field, a length field, a multi-FA allocation flag field and a mini ID field. The CID is used to identify a connection between an MS and a BS. The mini ID is identification information of the MS that will be used in the MS's secondary FAs. The DIUC indicates the number of slots to be received by each MS and a corresponding slot position as an MCS level. Burst profile information to be used for transmission is included and transmitted in a MAP to the MS.

The length field has 7 bits and indicates a slot length, that is, the number of slots, allocated in the primary FA. The multi-FA allocation flag is a 1-bit flag indicating a single-FA or a multi-FA. The multi-FA allocation flag field indicates the single-FA when a flag value is "0" and indicates the multi-FA when the flag value is "1". That is, the allocation flag indicates presence or absence of a mini ID, that is, identification information. The mini ID is used to identify an MS in the secondary FAs.

In the above Table 2, the MAP IE of the secondary FA includes a mini ID field and a length field.

The mini ID field has 3 bits and is used to identify an MS in the secondary FAs. The length field has 7 bits and indicates the number of slots allocated in the secondary FA.

In the case of separate coding, the tree-based allocation scheme is applied to a frequency resource allocation method for providing an overhead as minimal as possible. The MAP IE of the primary FA of each MS includes identification information allocated to identify MSs in secondary FAs. The identification information or mini ID is actually not required in a conventional separate coding MAP message since each MAP IE may only be decoded by a scheduled MS. However, a size of MAP IEs of the secondary FAs is smaller than a 48-bit physical resource block in the frequency resource allocation scheme based on identification information. To guarantee a small MAP overhead, multiple MAP IEs of the secondary FAs are packetized in one physical resource block and a CRC field having a maximum of 16 bits is added to an end part. All MSs using MAP IEs existing in the same frequency resource block share a scrambling key for decoding the MAP IEs. In this case of the separate coding, the mini ID is needed for the MS to identify its MAP IE from the other IEs that are included in the same frequency resource block. The MAP IE format used for the primary FA is shown in Table 3 and the MAP IE format used for the secondary FA is shown in Table 4. The following Table 3 shows a MAP IE structure of the primary FA in a separate coding MAP message and the following Table 4 shows a MAP IE structure of the secondary FA in the separate coding MAP message.

TABLE 3

| Fields | Bits | Comment |
| --- | --- | --- |
| DIUC | 4 | |
| Repetition Coding Indication | 2 | |
| Power Boosting | 3 | |

TABLE 3-continued

| Fields | Bits | Comment |
| --- | --- | --- |
| Node ID | 12 | Represents a node in a node tree |
| Multi-FA allocation flag | 1 | 0: Single-FA alloc. 1: Multi-FA alloc. |
| if(Multi-FA allocation flag ==1){ Mini ID } | 3 | ID used to identify a user in secondary FA(s) |
| CRC | 16 | |

TABLE 4

| Fields | Bits | Comment |
| --- | --- | --- |
| Mini ID | 3 | |
| Node ID | 12 | Represents a node in a node tree |
| If(End of resource block) CRC | 16 | |

In the above Table 3, the MAP IE of the primary FA includes a DIUC field, a repetition coding indication field, a power boosting field, a node ID field, a multi-FA allocation flag field, a mini ID field and a CRC field.

The DIUC indicates the number of slots to be received by each MS and a corresponding slot position as an MCS level. Burst profile information to be used for transmission is included and transmitted in a MAP to the MS. The node ID has 12 bits and represents a node in a node tree. The multi-FA allocation flag is a 1-bit flag indicating a single-FA or a multi-FA. The multi-FA allocation flag indicates the single-FA when a flag value is "0" and indicates the multi-FA when the flag value is "1". That is, the allocation flag indicates the presence or absence of a mini ID, that is, identification information. The mini ID field is used to identify an MS in the secondary FAs. The CRC field is used to verify an error.

In the above Table 4, the fields of the secondary FA include the mini ID and the node ID.

The mini ID has 3 bits and is used to identify an MS in the secondary FAs. The node ID has 12 bits and represents a node in a node tree.

Figure 5:
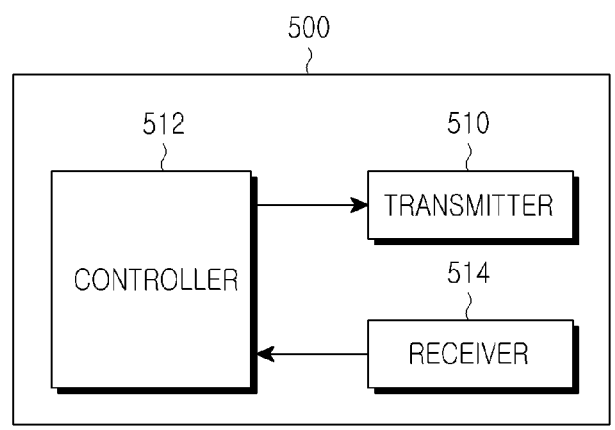
FIG. 5 is a block diagram illustrating a frequency overlay resource allocator based on identification information in a Base Station (BS) according to an exemplary embodiment of the present invention.

FIG. 5 is a block diagram illustrating a frequency overlay resource allocator based on identification information in a BS according to an exemplary embodiment of the present invention.

Referring to FIG. 5, the frequency overlay resource allocator 500 based on identification information in a BS includes a transmitter 510, a controller 512 and a receiver 514. The controller 512 of the BS includes control information, such as identification information, a resource indication and an MCS level in a primary FA MAP. Among the above-described control information elements, the identification information and the resource indication are allocated to a secondary FA MAP. The MAP information of a primary FA and a secondary FA is transmitted by the transmitter 510 in a corresponding FA.

Figure 6:
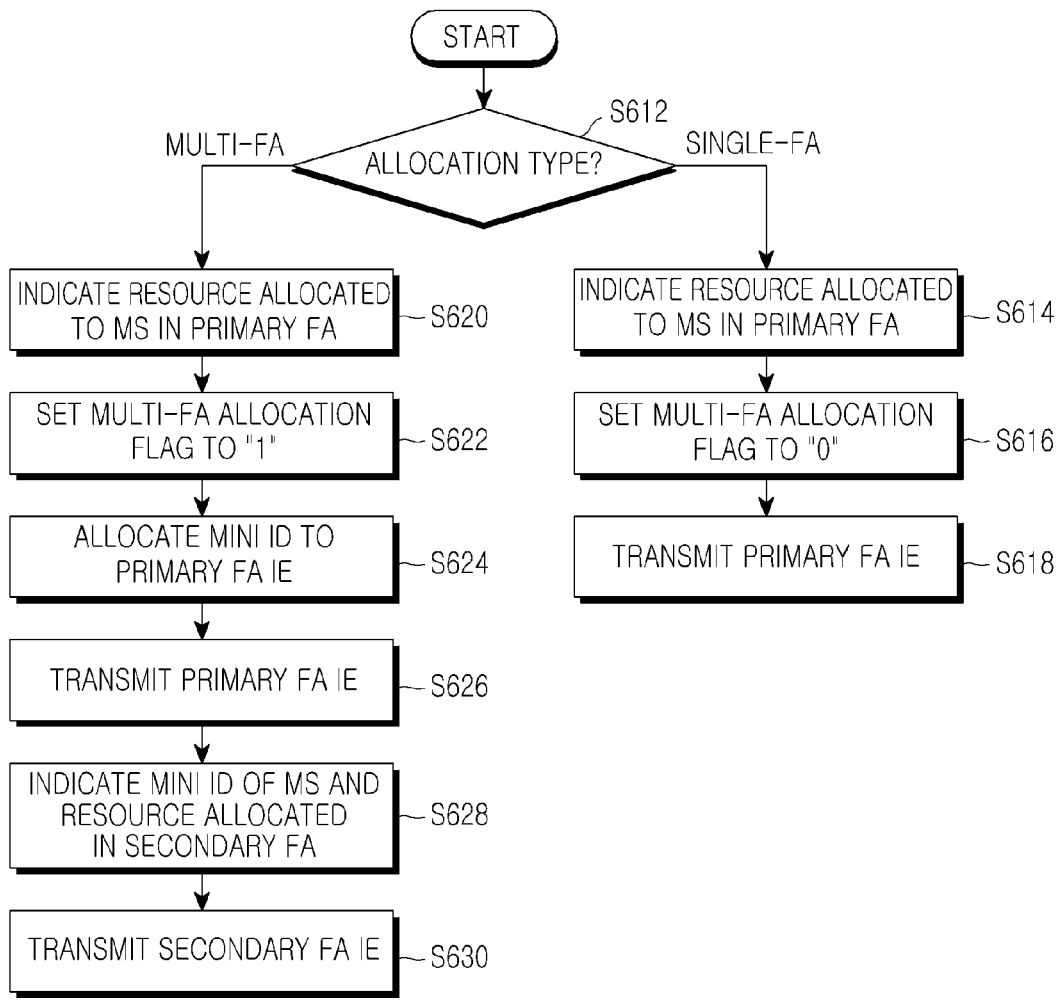
FIG. 6 is a flowchart illustrating a frequency overlay resource allocation method based on identification information in a BS according to an exemplary embodiment of the present invention.

FIG. 6 is a flowchart illustrating a frequency overlay resource allocation method based on identification information in a BS according to an exemplary embodiment of the present invention.

As illustrated, the BS determines whether an FA allocated to each MS is a single-FA or a multi-FA in step S612. When the single-FA is allocated to each MS, the BS inserts a resource indication indicating frequency resources allocated to each MS into a MAP IE of a primary FA and sets a multi-FA allocation flag to "0" in steps S614 and S616, respectively. The MAP IE of the primary FA is transmitted to the MS in step S618.

When it is determined that the multi-FA is allocated to each MS in step S612, the BS inserts a resource indication indicating allocated frequency resources into the MAP IE of the primary FA and sets the multi-FA allocation flag to "1" in steps S620 and S622, respectively. After step S622, identification information of MSs to which frequency resources are allocated is allocated to the MAP IE of the primary FA and the MAP IE of the primary FA is transmitted in steps S624 and S626, respectively. The identification information and the frequency resources allocated to each MS in a secondary FA are indicated in a MAP IE of the secondary FA and the MAP IE of the secondary FA is transmitted to the MS in steps S628 and S630, respectively.

Figure 7:
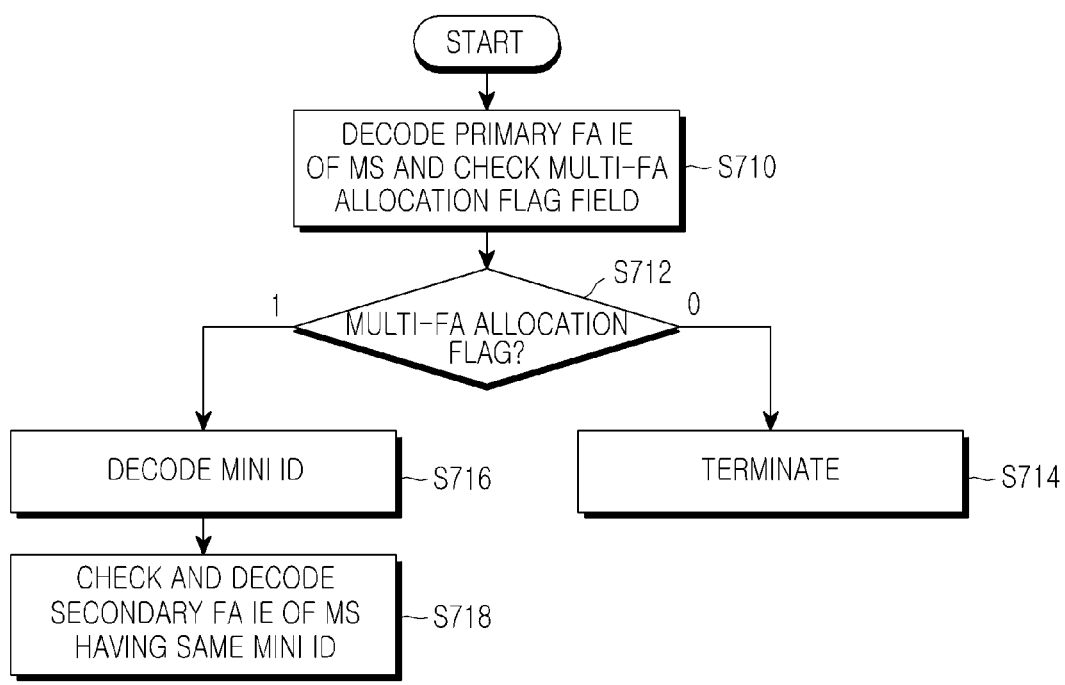
FIG. 7 is a flowchart illustrating a frequency overlay resource allocation method based on identification information in a Mobile Station (MS) according to an exemplary embodiment of the present invention.

FIG. 7 is a flowchart illustrating a frequency overlay resource allocation method based on identification information in an MS according to an exemplary embodiment of the present invention.

Referring to FIG. 7, the MS decodes a MAP IE of a primary FA received from a BS and checks a multi-FA allocation flag field extracted from the MAP IE of the primary FA in step S710. When it is determined that the multi-FA allocation flag field is "0" in step S712, the MS terminates the process in step S714. When it is determined that the multi-FA allocation flag field is "1" in step S712, the MS decodes its own allocated identification information from the MAP IE of the primary FA in step S716. After acquiring a resource indication indicating an allocated resource by decoding a MAP IE of a secondary FA having the same identification information, the MS communicates with the BS using the allocated resource in step S718.

In the exemplary embodiments of the present invention, an efficient ID allocation method for reducing a MAP overhead of multi-FA MSs is provided, so that an overhead may be reduced and a frequency resource may be used efficiently.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of receiving data in a wireless communication system, the method comprising:
   identifying a first carrier among a plurality of carriers as a carrier to receive a control message;
   receiving, based on a mobile station (MS) identifier (ID), the control message including a carrier indicator information indicating one of the plurality of carriers and at least two of modulation and coding scheme (MCS), resource allocation (RA) and power control information on the first carrier; and
   receiving data on the indicated one of the plurality of carriers based on the control message on the first carrier,
   wherein one media access control (MAC) layer is configured for the plurality of carriers.

2. The method of claim 1, wherein plural control messages are sent on the first carrier.

3. The method of claim 2, wherein the plural control messages are coded separately.

4. The method of claim 1, wherein the first carrier is configured per each MS.

5. The method of claim 1, wherein the RA is for a set of contiguously allocated frequencies.

6. The method of claim 1, wherein a presence of the carrier indicator information in the control message can be set.

7. A method of transmitting data in a wireless communication system, the method comprising:
   configuring communication with a mobile station (MS) using at least one carrier, wherein a first carrier of the at least one carrier is configured to transmit a control message;
   transmitting, based on an MS identifier (ID), the control message including a carrier indicator information indicating one of the at least one carrier, and at least two of modulation and coding scheme (MCS), resource allocation (RA) and power control information on the first carrier; and
   transmitting data on the indicated one of the at least one carrier based on the control message on the first carrier,
   wherein one media access control (MAC) layer is configured for the at least one carrier.

8. The method of claim 7, wherein plural control messages are sent on the first carrier.

9. The method of claim 8, wherein the plural control messages are coded separately.

10. The method of claim 7, wherein the first carrier is configured per each MS.

11. The method of claim 7, wherein the RA is for a set of contiguously allocated frequencies.

12. The method of claim 7, wherein a presence of the carrier indicator information in the control message can be set.

13. A mobile station (MS) for receiving data in a wireless communication system, the MS comprising:
   a controller configured to identify a first carrier among a plurality of carriers as a carrier to receive a control message; and
   a transceiver configured to:
      receive, based on an MS identifier (ID), the control message including a carrier indicator information indicating one of the plurality of carriers and at least two of modulation and coding scheme (MCS), resource allocation (RA) and power control information on the first carrier, and
      receive data on the indicated one of the plurality of carriers based on the control message on the first carrier,
   wherein one media access control (MAC) layer is configured for the plurality of carriers.

14. The MS of claim 13, wherein plural control messages are sent on the first carrier.

15. The MS of claim 14, wherein the plural control messages are coded separately.

16. The MS of claim 13, wherein the first carrier is configured per each MS.

17. The MS of claim 13, wherein the RA is for a set of contiguously allocated frequencies.

18. The MS of claim 13, wherein a presence of the carrier indicator information in the control message can be set.

19. A base station (BS) for transmitting data in a wireless communication system, the BS comprising:
   a controller configured to configure communication with a mobile station (MS) using at least one carrier, where a first carrier of the at least one carrier is configured to transmit a control message; and a transceiver configured to:
: transmit, based on an MS identifier (ID), the control message including a carrier indicator information indicating one of the at least one carrier, and at least two of modulation and coding scheme (MCS), resource allocation (RA) and power control information on the first carrier, and transmit data on the indicated one of the at least one carrier based on the control message on the first carrier, wherein one media access control (MAC) layer is configured for the at least one carrier.

20. The BS of claim 19, wherein plural control messages are sent on the first carrier.

21. The BS of claim 20, wherein the plural control messages are coded separately.

22. The BS of claim 19, wherein the first carrier is configured per each MS.

23. The BS of claim 19, wherein the RA is for a set of contiguously allocated frequencies.

24. The BS of claim 19, wherein a presence of the carrier indicator information in the control message can be set.

* * * * *